US005226990A

United States Patent [19]

Satomi

[11] Patent Number: 5,226,990

[45] Date of Patent: Jul. 13, 1993

[54] METHOD FOR MAKING A ROUGH DESIGN ON THE SURFACE OF AN OBJECT

[75] Inventor: Yoshie Satomi, Soka, Japan

[73] Assignee: Adger Kogyo Co., Ltd., Japan

[21] Appl. No.: 810,135

[22] Filed: Dec. 19, 1991

[51] Int. Cl.$^5$ .............................................. B32B 31/14

[52] U.S. Cl. ...................................... 156/62; 156/277; 434/85; 434/88

[58] Field of Search ......................... 156/62, 234, 277; 434/85, 88

[56] References Cited

U.S. PATENT DOCUMENTS

| | | | |
|---|---|---|---|
| 151,965 | 6/1874 | Forbriger | 434/85 |
| 4,161,250 | 7/1979 | Pierce | 156/62 |
| 4,328,051 | 5/1982 | Robinette | 434/88 |
| 4,611,994 | 9/1986 | Glover | 434/85 |
| 5,016,452 | 5/1991 | Alexander | 434/88 |

*Primary Examiner*—Caleb Weston
*Attorney, Agent, or Firm*—Lorusso & Loud

[57] ABSTRACT

A method and a kit for making a rough design on textile materials or leather goods are disclosed. The rough design is made on the surface of a textile material, for example, fabric by overlaying the original pattern on the surface thereof with a transparent or translucent, ink-permeable sheet material, tracing the original pattern on the sheet material with a writing element to form a copy pattern corresponding to the the original pattern on the surface of the sheet material, overlaying a fabric on the surface thereof with the sheet material having the copy pattern and thereafter tracing the copy pattern on the fabric with a writing element whereby ink from the element penetrates through the sheet material and onto the surface of the fabric to form the pattern thereon. According to a variant of the method and kit for making a rough design on the object, the sheet material may have a printed original pattern. By using inks of multiple colors, a multi-color pattern can be formed, for example, on cloth through the ink-permeable sheet material. Any correction of the pattern on the cloth can easily be made by using an erasable ink for the writing element.

6 Claims, No Drawings

METHOD FOR MAKING A ROUGH DESIGN ON THE SURFACE OF AN OBJECT

BACKGROUND OF THE INVENTION

1. Field of the Invention

The present invention relates to a method and a kit for making a rough design on an object, e.g. an object selected from textile materials or leather goods. More particularly, the present invention relates to a method for making a rough design, for example, on cloth used in handicraft such as embroidery work or textile printing and a kit for making a rough design, for example, on cloth, which comprises a transparent or translucent ink-permeating sheet material and a writing element containing an erasable ink.

2. Description of the Prior Art

An original pattern is often traced on the surface of a textile material in the field of handicraft to form a rough design on the surface of the material. In case of forming a rough design on cloth according to a conventional method, for example, an original pattern is firstly overlaid on the surface thereof with a commercially available tracing paper and is traced on the tracing paper with an ordinary writing tool such as a pencil or ball-point pen to form a copy pattern corresponding to the original one on the paper. As a second step, the cloth is overlaid on the surface thereof with a sheet containing a transfer ink layer (generally called "chaco-paper") and then with the tracing paper, and the copy pattern on the tracing paper is traced on the cloth with a steel pen or ball-point pen whereby the ink layer contained in the sheet is transferred onto the surface of the cloth.

In this method wherein the formation of the pattern on the cloth is made by transfer of the ink layer contained in the chaco-paper, however, the tracing work must be done by using the steel pen or ball-point pen with a strong writing pressure so that the copy pattern on the tracing paper is traced on the cloth through transfer of the ink layer. Accordingly, the tracing work was difficult in the case of complicated images and involved a problem such that the chaco-paper and/or cloth might be damaged by the action of the steel pen or ball-point pen with strong pressing force. What is more, another problem arises in this conventional method; if the tracing paper and/or the chaco-paper slips out of position, shearing in tracing may take place as the chaco-paper is non-transparent. In general, it is extremely difficult to arrange the chaco-paper in the original position, once it has got out of position.

Besides these drawbacks, this prior art involves the inherent disadvantage that the system requires three layers of a tracing paper, a chaco-paper and an object (cloth in this case). Thus, the tracing work becomes troublesome and tends to incur problems.

Accordingly, there is a great demand to develop a new art of making a rough design on an object wherein the tracing work is simplified without trouble.

BRIEF SUMMARY OF THE INVENTION

Accordingly, it is an object of the present invention to provide a method for making a rough design on textile materials or leather goods which overcomes all the drawbacks as seen in the prior art.

It is another object of the present invention to provide a method for making a rough design on textile materials or leather goods which comprises using a specific medium for tracing an original pattern on these materials or goods.

It is still another object of the present invention to provide a kit for making a rough design on textile materials or leather goods which comprises a combination of a specific sheet material for tracing and a specific writing element.

Other and further objects, features and advantages of the present invention will become apparent more fully from the following description.

As a result of extensive research made by the present inventors to overcome the above mentioned drawbacks in the prior art tracing work, it has now been found that the use of a transparent or translucent, ink-permeable sheet material enables exact tracing of an original pattern and direct tinting on the surface of an object while the use of a writing element containing an erasable ink facilitates any correction of the pattern, and that the conjoint use of these elements entirely overcomes all the drawbacks as seen in the prior art tracing work for making a rough design on the surface of an object. The present invention has been accomplished on the basis of the above finding.

In accordance with one embodiment of the present invention, there is provided a method for making a rough design on the surface of an object, which comprises the steps of (a) overlaying an original pattern on the surface thereof with a transparent or translucent, ink-permeable sheet material, (b) tracing the original pattern on the surface of the sheet material with a writing element to form a copy pattern corresponding to the original pattern on the surface of the sheet material, (c) overlaying an object on the surface thereof with the sheet material having the copy pattern and (d) tracing the copy pattern on the surface of the object with a writing element whereby ink from the element penetrates through the sheet material and adheres to the surface of the object to form the pattern thereon.

In accordance with a variant of the above method, there is provided a method for making a rough design on the surface of an object, which comprises overlaying an object on the surface thereof with a transparent or translucent, ink-permeable sheet material carrying a printed pattern and tracing the printed pattern on the surface of the object with a writing element whereby ink from the element penetrates through the sheet material and onto the surface of the object to form the pattern thereon.

In accordance with another embodiment of the present invention, there is provided a kit for making a rough design on the surface of an object, which comprises a transparent or translucent, ink-permeable sheet material and a writing element containing an erasable ink.

In accordance with a variant of the kit, the sheet material carries a printed pattern.

It is one of the features of this invention that an object is always overlaid on the surface thereof with a single element, i.e. the specific sheet material for tracing work without necessity of plural elements, e.g. a combination of tracing paper and a chaco-paper as in the prior art method.

It is another feature of this invention that any correction of the pattern can be made in the sheet material without staining an object unlike the tracing work in the prior art method wherein an object is tinted with an ink transferred from the chaco-paper under strong pressing force with a writing tool.

DETAILED DESCRIPTION OF THE INVENTION

The sheet material used in the method of this invention for tracing work must be transparent or translucent (to allow one to see the original pattern therethrough) and ink-permeable. Illustrative of the sheet material are, for example, a thin paper, a thin tissue paper, a thin textile fabric and a thin non-woven fabric. A thin fabric and thin tissue paper are preferable as the sheet material. A commercially available translucent tracing paper cannot be used in the present invention, since it is not permeated by inks.

In the method of this invention, the steps (a) and (b) are firstly carried out by overlaying the original pattern on the surface thereof with the sheet material and tracing the original pattern on the surface of the sheet material with a writing element whereby a copy pattern corresponding to the original pattern is formed on the surface of the sheet material. Accordingly, the work itself for the steps (a) and (b) is very simple and easy. Any kind of writing tool such as a pencil, a sign pen, and a ball-point pen can be used as writing element in this case, as the tracing work needs no strong pen pressure. The use of a ball-point pen is preferable so long as the pen touch is smooth.

In the successive steps (c) and (d), an object is overlaid on the surface thereof with the sheet material carrying the copy pattern obtained in the step (b) and the copy pattern is then traced on the surface of the object with a writing element containing an ink capable of permeating the sheet material. The work for the steps (c) and (d) is also simple and easy. In this case, the ink penetrates through the sheet material and onto the surface of the object to form the pattern thereon. No limitation exists as to the type of the writing element so long as it contains an ink permeable through the sheet material. For example, a sign pen, ball-point pen and a fountain pen are conveniently employed as the writing element for this purpose. The writing element containing a water-soluble ink such as a sign pen or a coloring pen is preferably used. Especially preferred in the present invention is the use of one containing an erasable water-soluble ink. Various erasable inks are now commercially available, for example, those erasable with water, a reducing agent, a diluted acid or spontaneously erasable by being allowed to stand are known in the art. The erasable ink is suitably selected from these various ones according to the intended purpose. In some cases, an ink of a certain dyestuff which is erasable by a reducing agent capable of converting it into a leuco base, whereby the color is temporarily lost is particularly advantageous since the pattern once erased is regenerated by addition of an oxidizing agent. In case of using such erasable ink, lines or dots erroneously placed on the sheet material or the object by the writing element can easily be erased, and correction or modification of the pattern can also be made by rewriting the lines or dots in the area where the pattern originally depicted has been erased.

According to the method of this invention, the tracing work with the writing element can be made with mild pen pressure since transfer of the ink contained in the writing element to the object is made simply by permeation of the ink through the sheet material. Thus, there is almost no fear of damage or breakage of the sheet material or the object due to strong pressing force.

In the present invention, textile materials such as fabric, non-woven fabric and cloth for handicraft as well as leather goods such as a leather belt, bag and strip for handicraft can be used as an object on which a rough design is to be formed.

It is one of the great advantages in the present invention that the sheet material carrying the copy pattern can correctly be positioned on the surface of the object since the sheet material itself is transparent or translucent. The pattern and its color and concentration can easily be confirmed by visibly watching the transparent or translucent sheet material. Even if the sheet material is slipped out of the original position during the tracing work, it can easily be relocated to the original position by bringing the pattern on the transparent or translucent sheet material into agreement with the pattern on the object.

According to the variant of the present invention, the original pattern may previously e printed on the sheet material. In this case, the steps (a) and (b) for overlaying the original pattern with the sheet material and tracing the pattern on the surface of the sheet material with the writing element can be omitted. This variant is especially desirable in case a recurring pattern of ordinary figures such as circle, triangle and a definite shape of pattern is to be formed on the surface of the object.

It is a merit of the present invention that the tracing work is very simple and easy as compared with the prior art method since the sheet material is transparent or translucent and can be positioned exactly in a given location on the object.

It is an additional merit of the present invention that a multi-color pattern can easily be formed on the object by using plural color pens for the single sheet material. This is particularly advantageous in case of making embroidery with multi-color yarns, since yarns of different colors can be selected according to the multi-color pattern formed on the object. The work can thus be carried out at a high efficiency. In the prior art method, on the contrary, a plurality of chaco-papers of different colors have to be used for making a multi-color pattern on the surface of the object and the tracing work for such multi-color pattern has to be carried out repeatedly and so is extremely difficult and troublesome.

It is further merit of the present invention that the use of the writing element containing an erasable ink enables, as described above, correction of the pattern formed in the sheet material and/or on the object.

Accordingly, the present invention is particularly useful for making a rough design for embroidery or patch-work on the surface of an object in the field of handicraft, for example, cloth or leather strip.

The present invention will now be illustrated in more detail by way of an example but the present invention is not intended to be limited by this example.

EXAMPLE

In this example, a non-woven fabric was used as the object, a thin tissue paper as the sheet material and a sign pen containing an erasable ink (Chaco-Ace with eraser, manufactured by Adger Ind. Co., Ltd., Japan) as the writing element.

At the outset, a sheet of paper with a printed pattern was used as an original pattern and was overlaid on the surface thereof with the thin tissue paper. The original pattern was traced on the surface of the thin tissue paper with a ball-point pen to form a copy pattern corresponding to the original.

Next, the non-woven fabric was overlaid on the surface thereof with the thin tissue paper and the copy pattern was traced on the surface of the fabric with the writing element whereby the ink of the sign pen permeated through the sheet material and onto the surface of the fabric to form a rough design in conformity with the pattern. In this case, the sheet material was translucent so that the tracing work on the fabric was easy. Lines and dots erroneously depicted with the writing element could be erased easily by using an erasing pen containing an erasing ink. During the tracing work, the sheet material was purposely removed but could easily be relocated to the original position. Thus, the original pattern was easily traced on the surface of the non-woven fabric.

A multi-color rough design could also be formed on the fabric by using plural sign pens of different colors in the same manner as above without using plural sheet materials.

What is claimed is:

1. A method for making a rough design on a receiving surface of an object, which comprises the steps of (a) overlaying a surface bearing on original pattern with an ink-permeable tissue paper, (b) tracing the original pattern on the tissue paper with a writing element to form a copy pattern corresponding to the original pattern on the surface of the tissue paper, (c) overlaying the receiving surface with the tissue paper having the copy pattern and (d) tracing the copy pattern with a writing element containing an erasable ink whereby the ink of the element penetrates through the tissue paper onto the receiving surface to form the rough design thereon.

2. A method according to claim 1, wherein said object having said receiving surface is a cloth material.

3. A method according to claim 1, wherein step (d) comprises tracing with a plurality of pens containing different erasable color inks.

4. A method for making a rough design on a receiving surface of an object, which comprises overlaying the receiving surface with an ink-permeable tissue paper carrying a printed pattern and tracing the printed pattern with a writing element containing an erasable ink whereby the ink of the element penetrates through the tissue paper and onto the receiving surface of the object to form the rough design thereon.

5. A method according to claim 4, wherein step (d') comprises tracing with a plurality of pens containing different erasable color inks.

6. A method according to claim 4, wherein said object having said receiving surface is a cloth material.

* * * * *